(12) United States Patent
Pero

(10) Patent No.: US 12,479,644 B1
(45) Date of Patent: Nov. 25, 2025

(54) SEALED ORTHO-GRID LASER AND IMAGING DIRECTOR WITH AN ORTHO/ISO-GRID PRESSURE VESSEL

(71) Applicant: United States of America, Department of the Navy, Arlington, VA (US)

(72) Inventor: Michael J. Pero, King George, VA (US)

(*) Notice: Subject to any disclaimer, the term of this patent is extended or adjusted under 35 U.S.C. 154(b) by 174 days.

(21) Appl. No.: 18/446,061

(22) Filed: Aug. 8, 2023

Related U.S. Application Data

(60) Provisional application No. 63/441,209, filed on Jan. 26, 2023.

(51) Int. Cl.
*B65D 81/02* (2006.01)
*B65D 53/02* (2006.01)
*G01J 1/04* (2006.01)

(52) U.S. Cl.
CPC ............. *B65D 81/02* (2013.01); *B65D 53/02* (2013.01); *G01J 1/0403* (2013.01)

(58) Field of Classification Search
CPC ........................................................ B65D 81/02
USPC .......................................................... 385/136
See application file for complete search history.

(56) References Cited

U.S. PATENT DOCUMENTS

| | | | | |
|---|---|---|---|---|
| 4,406,855 A | * | 9/1983 | Schwiers | G21C 17/002 376/250 |
| 5,386,440 A | * | 1/1995 | Kashiwai | G21C 3/322 376/362 |
| 5,617,457 A | * | 4/1997 | Ren | G21C 3/322 376/234 |
| 6,240,156 B1 | * | 5/2001 | Matsumoto | G21C 5/02 411/80 |
| 6,471,861 B1 | * | 10/2002 | Burgard | B01D 3/008 210/232 |
| 9,365,013 B2 | * | 6/2016 | Fink | H04R 17/00 |
| 10,247,894 B2 | * | 4/2019 | Kimbrell | G02B 6/4441 |
| 10,589,878 B2 | * | 3/2020 | Veto | B33Y 80/00 |
| 2006/0153327 A1 | * | 7/2006 | Jiang | G21C 3/352 376/438 |
| 2010/0322371 A1 | * | 12/2010 | Jiang | G21C 3/344 376/439 |
| 2011/0033020 A1 | * | 2/2011 | Jiang | G21C 3/322 376/442 |
| 2019/0344908 A1 | * | 11/2019 | Heltsch | B29C 64/268 |
| 2019/0359895 A1 | * | 11/2019 | Thomas | B01D 17/06 |

FOREIGN PATENT DOCUMENTS

| | | | | |
|---|---|---|---|---|
| AU | 2017235996 A1 | * | 6/2018 | ............ F17C 13/002 |
| CN | 100398288 C | * | 7/2008 | ............ B29B 13/00 |
| DE | 2323678 A | * | 5/1973 | |
| GB | 1131241 A | * | 10/1968 | ............ G21C 1/028 |
| JP | 2000271455 A | * | 10/2000 | |
| JP | 2000271456 A | * | 10/2000 | |
| JP | 2018149771 A | * | 9/2018 | ......... B29D 99/0014 |
| JP | 2020050332 A | * | 4/2020 | ............ B64C 1/068 |
| WO | WO-2004011169 A2 | * | 2/2004 | ........... B29C 70/549 |
| WO | WO-2022253392 A1 | * | 12/2022 | ............... G21C 5/02 |

\* cited by examiner

*Primary Examiner* — Kaveh C Kianni

(57) ABSTRACT

A pressure vessel that comprises an ortho-grid and an iso-grid wherein a stress subjected to the pressure vessel is propagated into the iso-grid through the ortho-grid.

19 Claims, 11 Drawing Sheets

SEALED ORTHO-GRID LASER AND IMAGING DIRECTOR WITH AN ORTHO/ISO-GRID PRESSURE VESSEL

CROSS REFERENCE TO RELATED APPLICATION

Pursuant to 35 U.S.C. § 119, the benefit of priority from provisional application 63/441,209 with a filing date of Jan. 26, 2023, is claimed for this non-provisional application and assigned Navy Case 211423.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to optical equipment. In particular, a storage system for protecting optical equipment in harsh environments.

SUMMARY

A Sealed Ortho-Grid Laser and Imaging Director (SOLID) includes a yoke, a gimbal rotationally attached to the yoke, a pressure vessel slidably engaged with the yoke, and a seal. The SOLID is used to deploy optical equipment in harsh environments such as oceans. The SOLID includes a pressure vessel that comprises an ortho-grid and an iso-grid wherein a stress subjected to the pressure vessel is propagated into the iso-grid through the ortho-grid.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with an exemplary embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith.

Figure 1A:
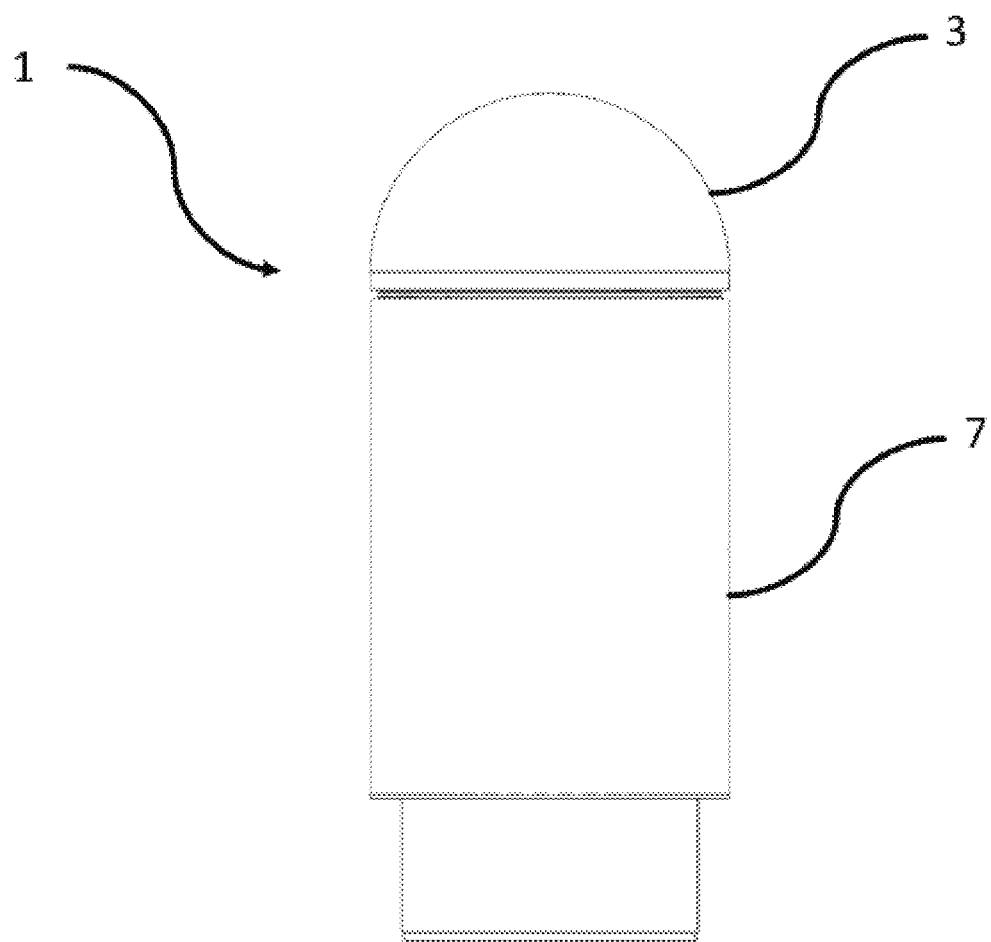
FIGS. 1A-C show the Sealed Ortho-Grid Laser and Imaging Director (SOLID) in a stowed, standby, and engaged position.
Figure 1B:
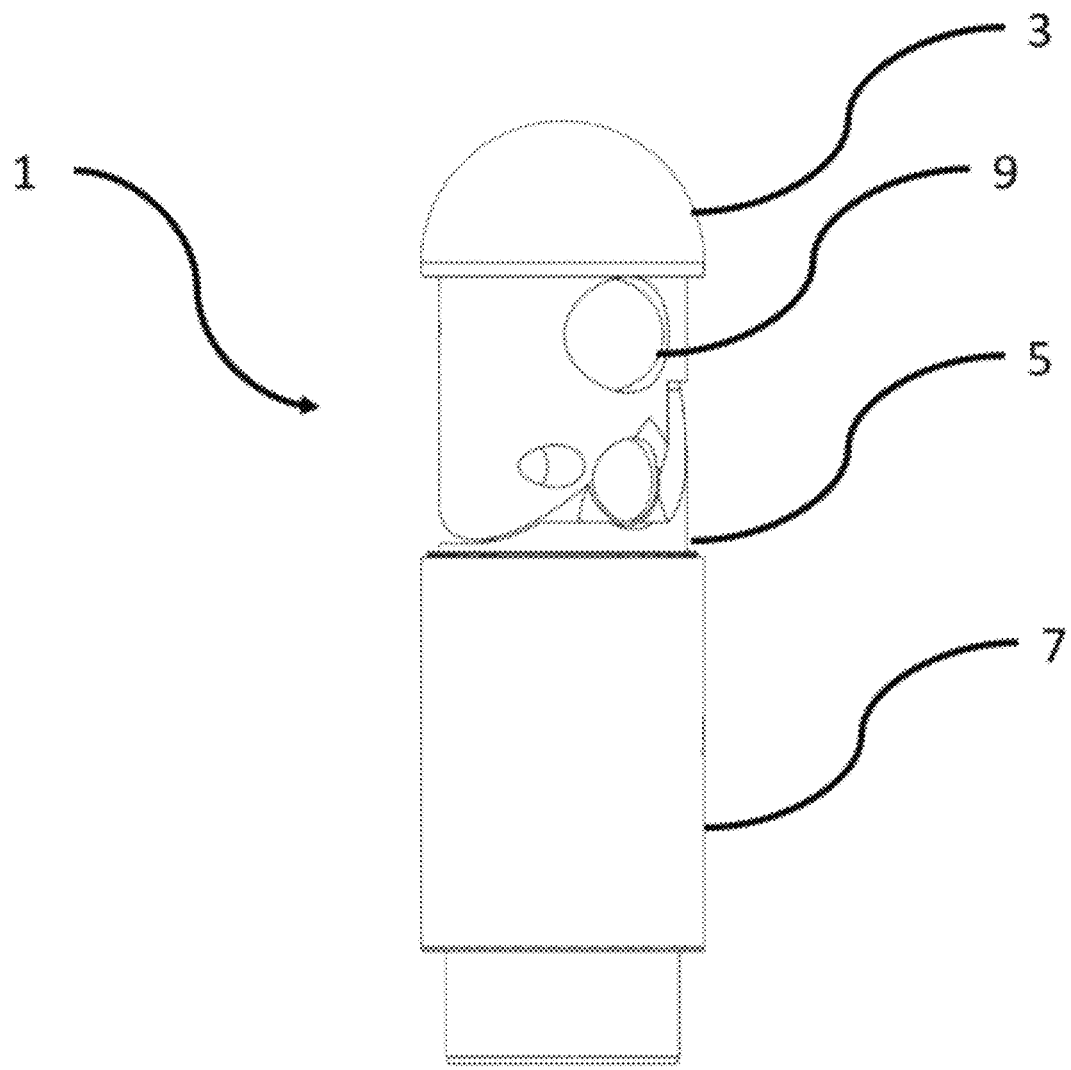
Figure 1C:
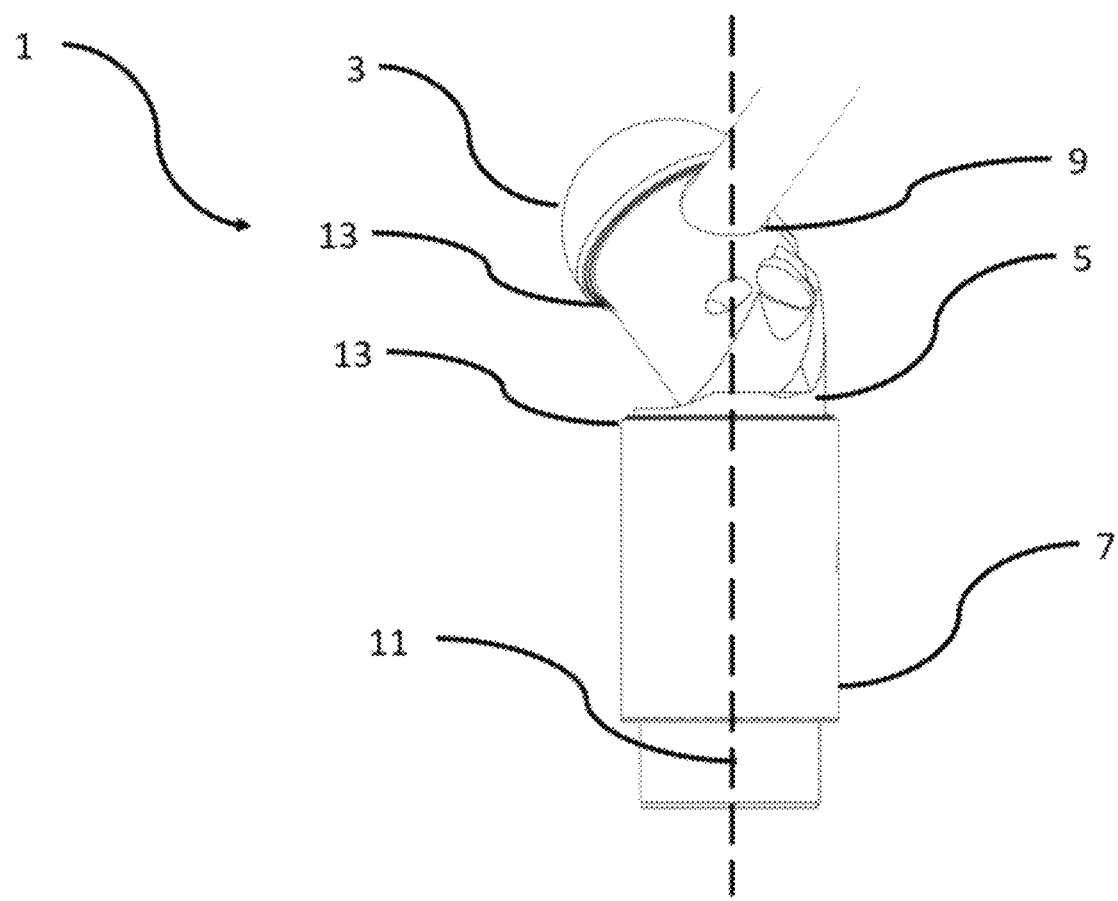

FIGS. 1A-C shows a Sealed Ortho-grid Laser and Imaging Director (SOLID) 1 in a variety of positions. The SOLID includes a beam director gimbal 3, a beam director yoke 5, and a pressure housing 7. In FIG. 1A, the SOLID 1 is shown in a stowed position. In FIG. 1B, the SOLID 1 is shown in a standby position. In FIG. 1C, the SOLID 1 is shown in an engagement position. The apparatus includes an actuator (not shown) which tilts the beam director gimbal 3, rotates the beam director yoke 5, and moves the apparatus between stowed, standby, and deployed positions.

As shown in FIG. 1C, the beam director gimbal 3, also called the gimbal, is rotationally attached to the beam director yoke 5. The gimbal 3 houses optical equipment 9 which may include lasers and/or cameras in an interior space. The gimbal maintains the optical equipment 9 level in unsteady environments such as on a vehicle or optical equipment carried by a person. The gimbal 3 maintains the optical equipment level by tilting the optical equipment with respect to axis 11 that extends through the pressure vessel 7. The beam director yoke 5, also called the yoke, is rotatably attached to the pressure vessel 7. The yoke 5 rotates the gimbal about axis 11. The pressure vessel 7 is slidably connected to the yoke 5 such that the pressure vessel 7 houses the yoke and the gimbal while SOLID is in a stowed position (as shown in FIG. 1B). Further, the slidable connection allows SOLID to move to a deployed position. The deployed position includes both the standby position (as shown in FIG. 1C) and the engagement position (as shown in FIG. 1). When the SOLID 1 is transitioned to the stowed position the multi-stage seal 13 is engaged to seal the optical equipment 9 from the environment.

Figure 2:
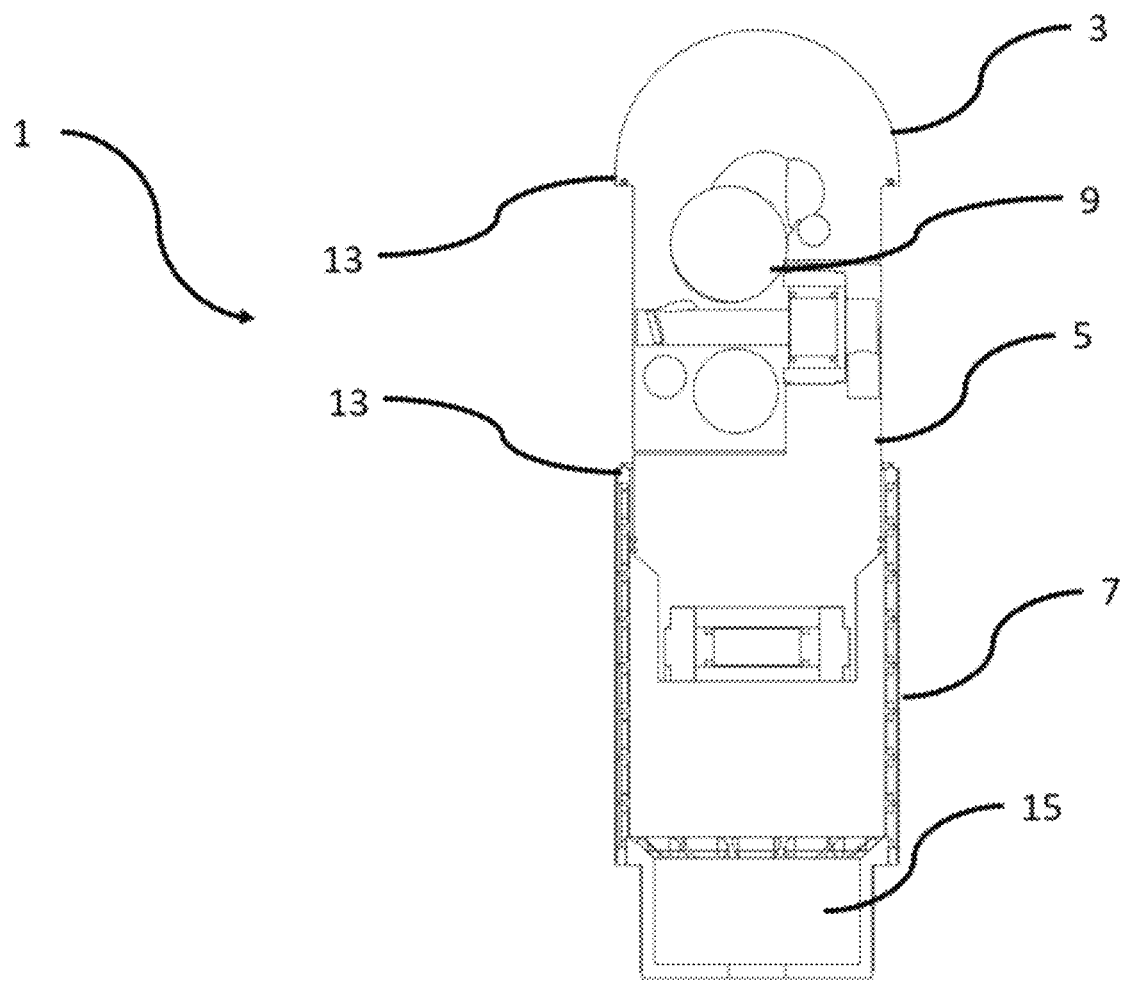
FIG. 2 is a cut-away view of the SOLID in the standby position.

FIG. 2 is a cut-away view of the SOLID 1 in the standby position. The upper portion of the multi-stage seal 13 is arranged on the beam director gimbal 3 and the lower portion of the multi-stage seal 13 is arranged on the pressure vessel. Additionally, the pressure vessel 7 includes an interior space 15 which slidably receives the beam director gimbal 3 and the beam director yolk 5 when the SOLID 1 is placed in the stowed position shown in FIG. 1A.

Figures 3A, 3B:
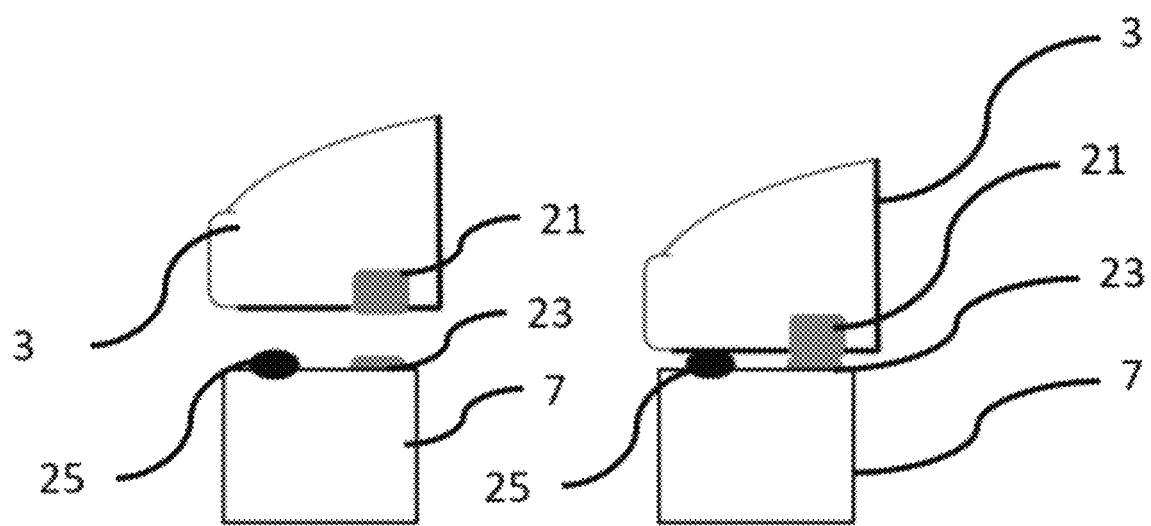
FIGS. 3A and 3B show one embodiment of the multi-stage seal.

FIGS. 3A and 3B show one embodiment of the multi-stage seal 13. In this embodiment, a first seal which includes an upper seal 21 fixed to the beam director gimbal 3 and a lower seal 23 fixed to the pressure vessel 7. In other embodiments, the first seal may comprise only a single seal fixed to either the beam director gimbal 3 or the pressure vessel 7. The multi-stage seal further includes a second seal 25 which may be fixed to either the beam director gimbal 3 or the pressure vessel 7. In some embodiments, the first seal 21, 23 engages before the second seal 25 which allows the liquid or gas to be self-purged from the interior space between the seals. In further embodiments, the first seal is a higher pressure seal than the remaining seals. An exemplary material for the first seal is nylon plastic with Durometer D85 hardness (hard). Exemplary materials for the remaining seals are rubber seals with Durometer 70A hardness (medium hardness). The advantage of including a first seal with a higher hardness is that the SOLID can be used in a high pressure subsea environment that advantageously uses hydro-pressure to increase the self-sealing of the SOLID. The advantage of using a softer lower pressure-rated second and/or third seal is that it minimizes the required actuator strength. Further, this design advantageously allows seawater to self-purge liquid or gas to the environment between the first seal and the second and/or third seals due to the difference in hardness between the seals.

Figure 4:
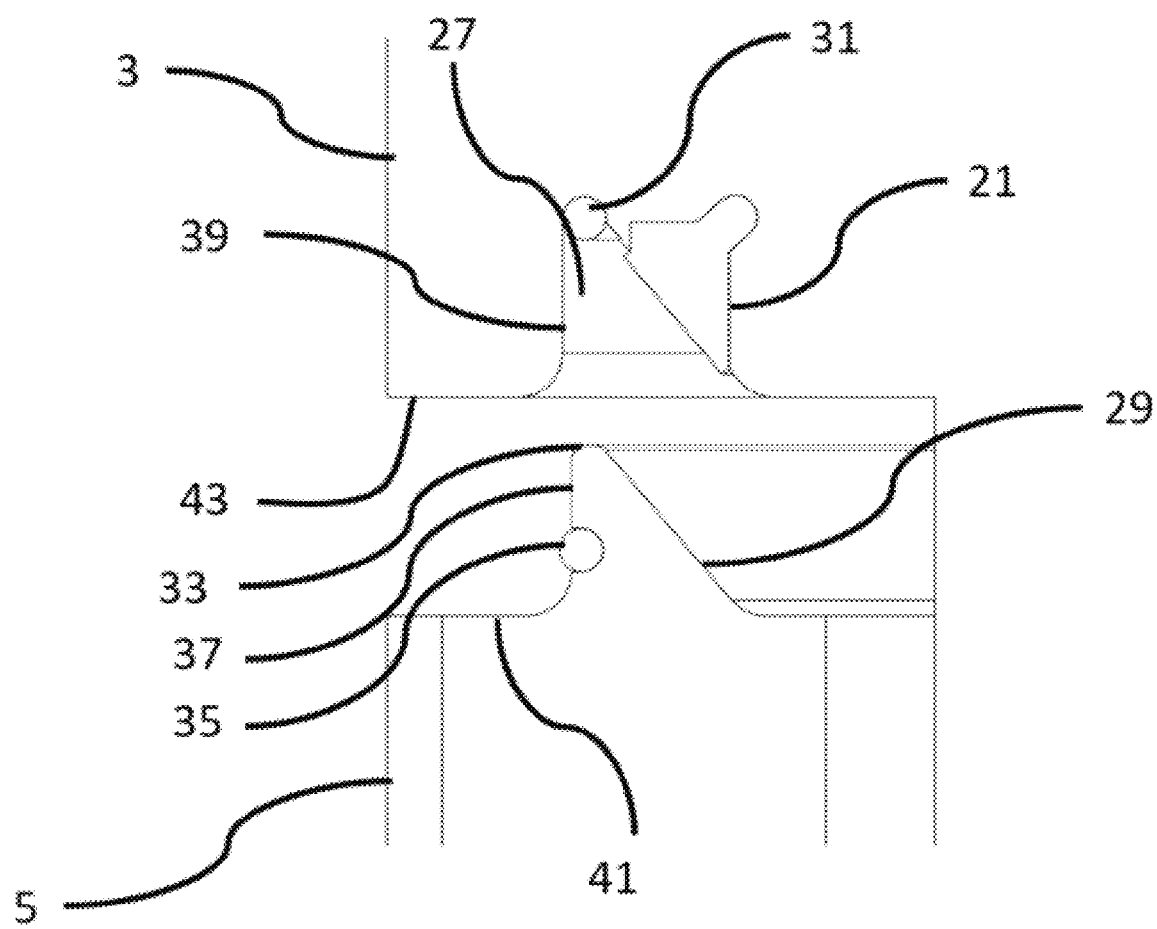
FIG. 4 is another embodiment of the multi-stage seal.

FIG. 4 is another embodiment of the multi-stage seal. In this embodiment, the beam director gimbal 3 includes a recess 27 which engages with a rim 29 that is formed in the pressure vessel 7. The shape of the recess 27 corresponds with the shape of the rim 29. In some embodiments, the shape is a rounded frustum. The multi-stage seal 13 further includes a second seal 31 fixed to the beam director gimbal 3. In some embodiments, the second seal 31 is arranged such that it engages with the peak 33 of the rim 29. In further embodiments, the multi-stage seal may further include a third seal 35 fixed to the pressure vessel 5. In some embodiments, the third seal is fixed to an outer surface 37 of the rim 29 such that it engages with an outer surface 39 of the recess 27. In this embodiment, the third seal 35 engages before the remaining seals. In other embodiments (not shown), the third seal is fixed to either surface 41 of the pressure vessel 5 or on the surface 43 of the beam director gimbal 3.

Figure 5:
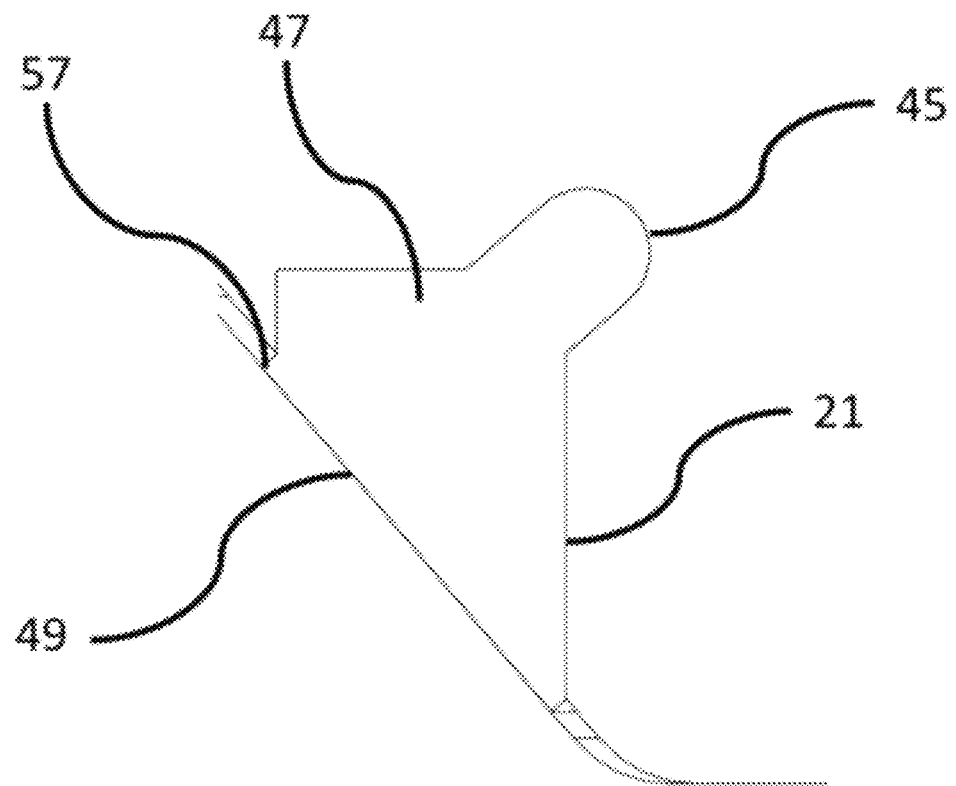
FIG. 5 shows a cross-section of the first seal.

FIG. 5 shows a cross-section of the first seal 21. The first seal includes a fastening portion 45 and a crush volume 47. The fastening portion 45 engages with the beam director gimbal 3 to ensure that the first seal 21 remains fixed to the beam director gimbal 3. The crush volume 47 allows the seal to be compressed as the pressure on surface 49 increases. The crush volume 47 further allows the surface contact area 51 to decrease rather than cracking and/or deforming by allowing the first seal 21 to be compressed into the crush volume 47 rather than expanding out at surface 51.

Figure 6:
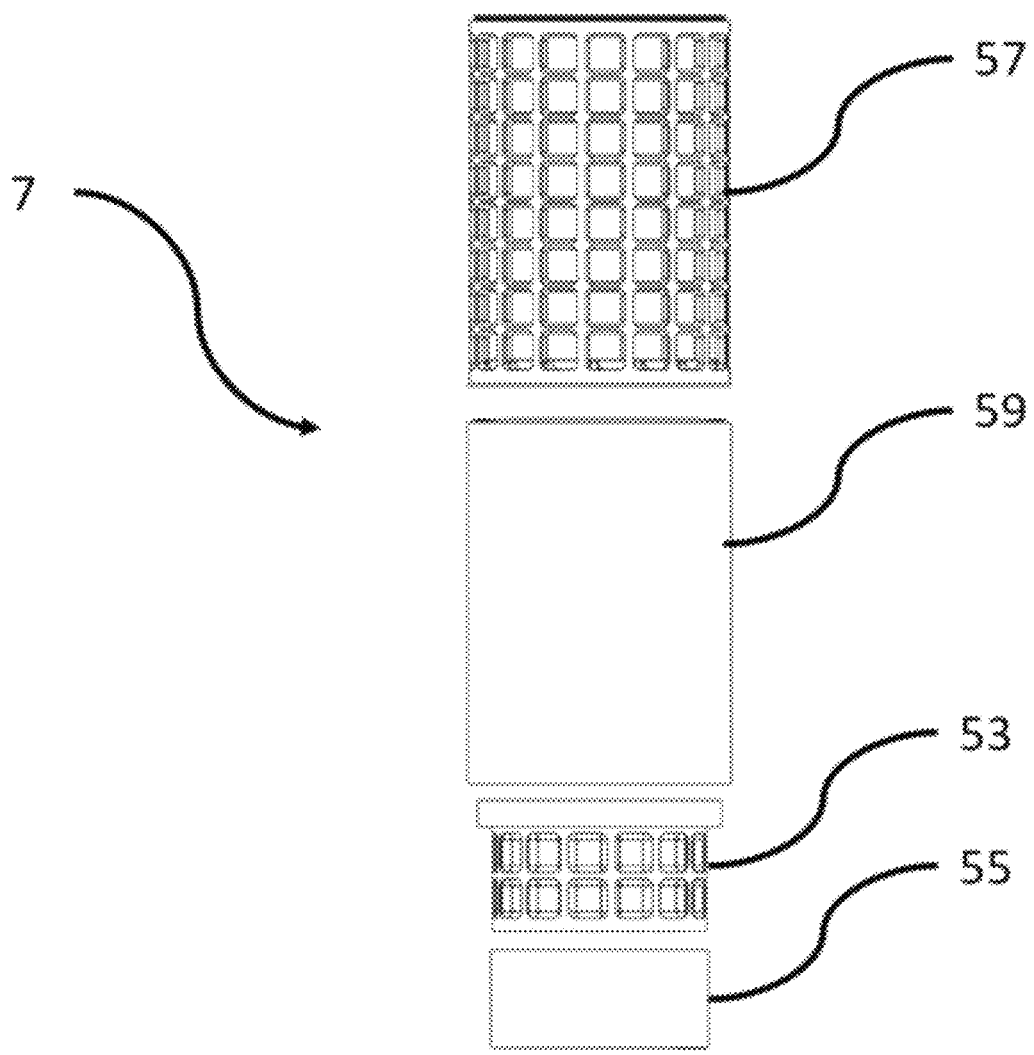
FIG. 6 is an exploded view of the pressure vess.

FIG. 6 is an exploded view of the pressure vessel 7. As seen in this view, the pressure vessel 7 includes an ortho-grid 53, an iso-grid 58 (shown in FIG. 7), a shroud 55, a second ortho-grid 57, and a second shroud 59. The shrouds 55, 59 are fixed to the corresponding ortho-grids and prevent the environmental elements (liquid or gas) from contacting the optical equipment housed inside the pressure vessel 7.

Figure 7:
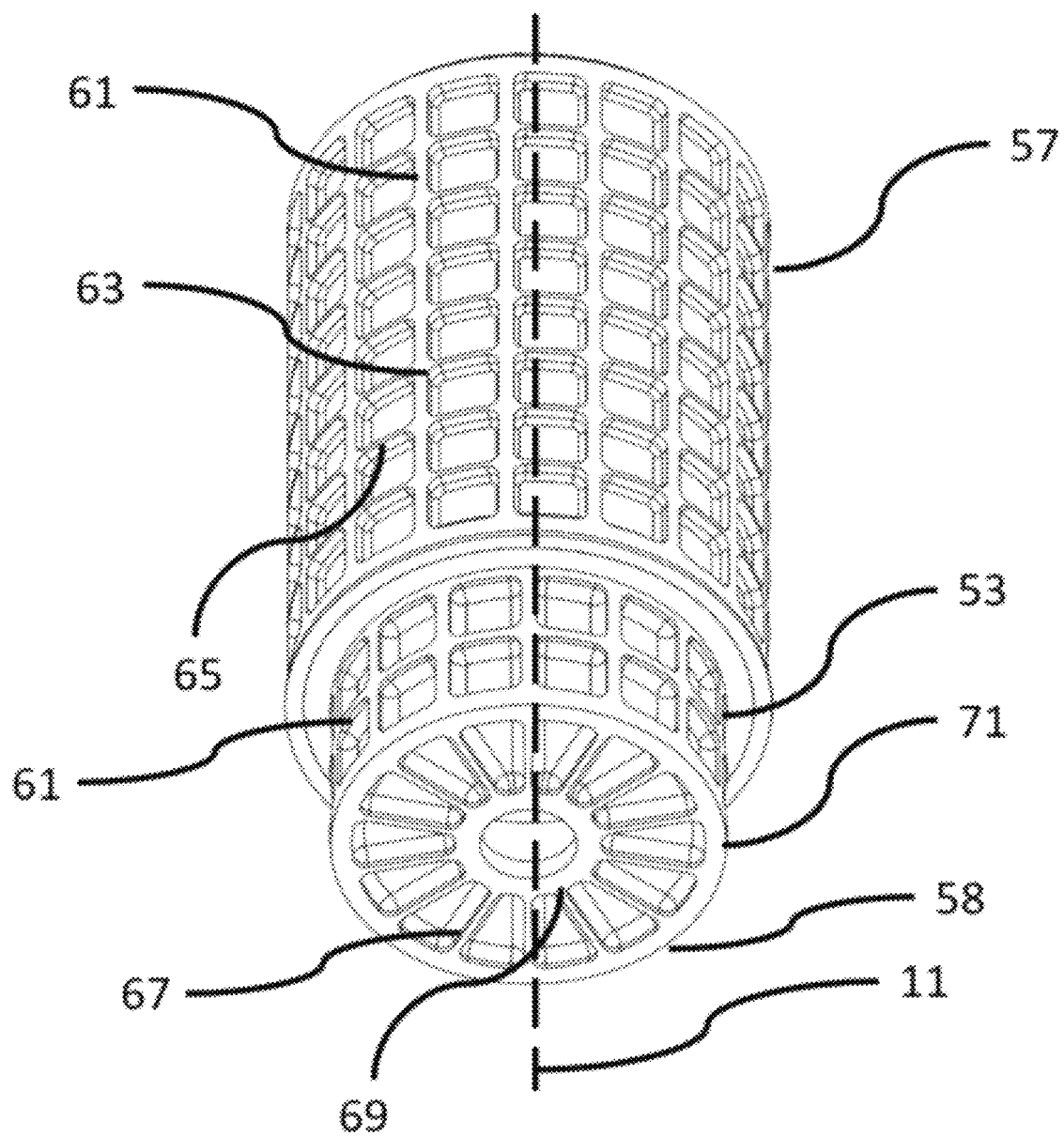
FIG. 7 shows a detailed view of the ortho-grids and the iso-grid.
Figure 8:
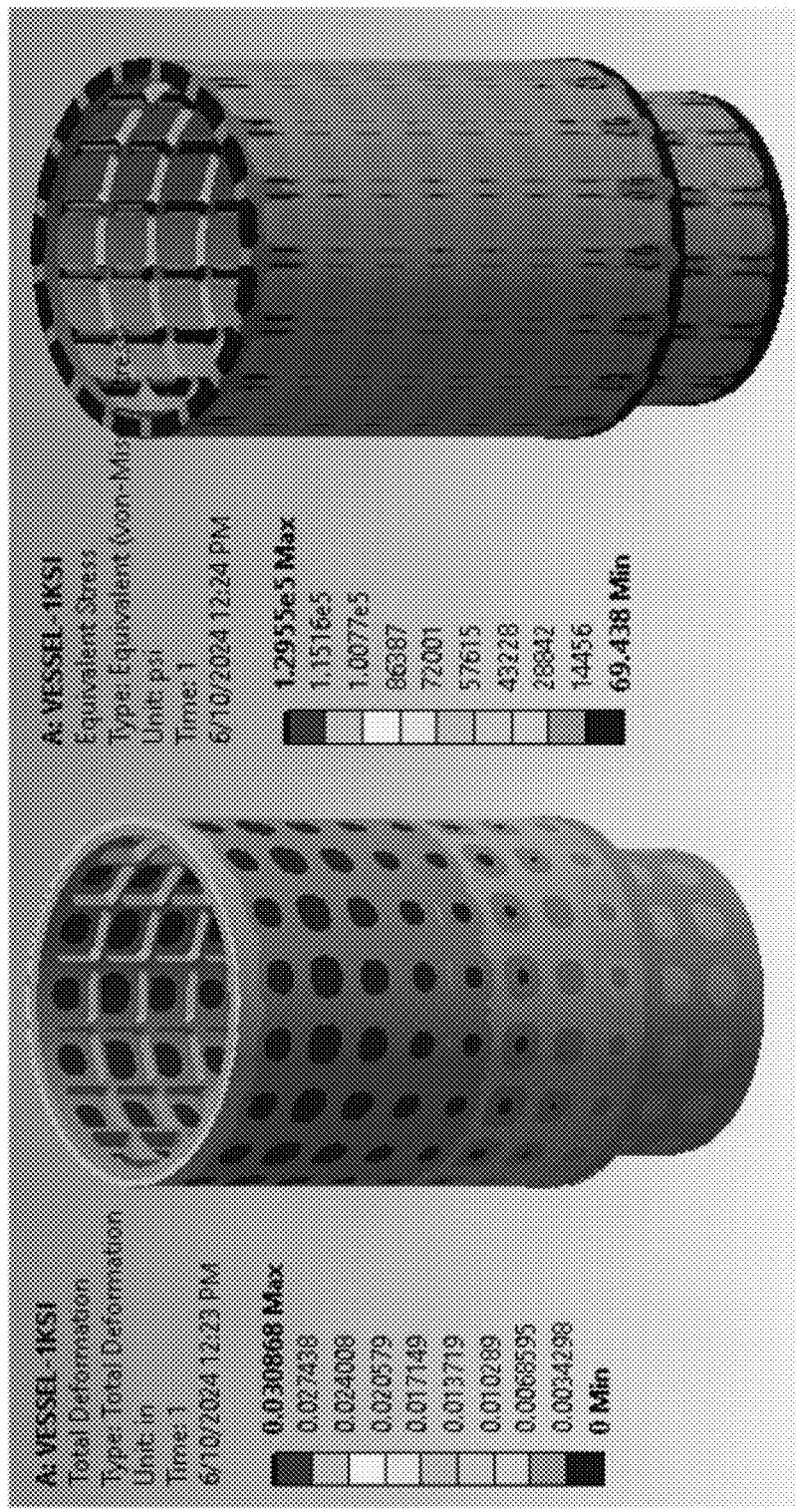
FIG. 8 shows a Finite Element Analysis (FEA) of the SOLID under pressure.

FIG. 7 shows a detailed view of the ortho-grids 53, 57 and the iso-grid 58. Each of the ortho-grids 53, 57 includes a plurality of axial columns 61, a plurality of nodes 63, and at least one cylindrical spar 65. In the ortho-grids 53, 57, the axial columns 61 are arranged circumferentially around axis 11 and the cylindrical spars 65 are arranged circumferentially around axis 11 and the axial columns 61 are fixed to the cylindrical spars 65 at a node 63. The iso-grid 58 includes a hub 69, radial spokes 67, and an iso-grid rim 71. The iso-grid 58 is fixed to ortho-grid 53 at cylindrical spar 65. The radial spokes 67 direct radial forces on the ortho-grid 53 from the iso-grid rim 71 to the hub 69. Each axial column 61 terminate at the iso-grid rim 71 proximate to a spoke 67. This configuration allows for both axial and non-axial forces to propagate from the ortho-grid to the iso-grid with minimum deformation of the pressure vessel (as shown in FIG. 8). This node-matched ortho/iso-grid design advantageously maximizes hydrodynamic pressure joint strength from a biaxial pressure load in the ortho-grid to a multiaxial pressure load in the iso-grid 58. This node-matched ortho/iso-grid design further allows the ortho-grid to be less robustly designed because the pressure forces are propagated into the strong iso-grid at the rim 71. As shown in FIG. 8, a Finite Element Analysis (FEA) shows less than 0.02" maximum deflection under 1,000 PSI load.

Figure 9:
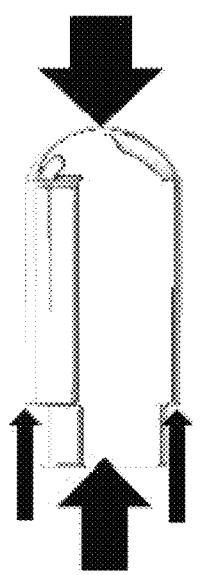
FIG. 9 shows the SOLID in a subsea environment.

FIG. 9 shows the SOLID in a subsea environment. This design advantageously reduces the risk of actuator failure because in a subsea environment, the multi-stage seal uses the water pressure (Identified by black arrows) to further engage the multi-stage seal.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus comprising:
   a pressure vessel comprising;
      an ortho-grid comprising;
         a plurality of vertical columns;
         a plurality of nodes; and
         at least one cylindrical spar connected to the vertical columns at one of the plurality of nodes; and
      an iso-grid;
         wherein a stress subjected to the pressure vessel is propagated into the ortho-grid and the iso-grid.

2. The apparatus according to claim 1, wherein the pressure vessel is a cylindrical.

3. The apparatus according to claim 1, wherein the iso-grid further comprises:
   a plurality of radial bars connected to the ortho-grid at the plurality of nodes.

4. The apparatus according to claim 3, wherein the iso-grid further comprises:
   a hub connected to one end of each of the radial bars.

5. The apparatus according to claim 1, wherein the ortho-grid further comprises:
   a plurality of vertical columns;
   at least one cylindrical spar perpendicularly connected to the vertical columns; and
   the iso-grid further comprises:
   a plurality of radial spokes;
   wherein the radial spokes are perpendicularly connected to the vertical columns such that the stress subjected to the ortho-grid is propagated into the radial spokes.

6. The apparatus according to claim 1, wherein the pressure vessel further comprises:
   an outer surface attached to the ortho-grid such that the stress is propagated from the outer surface to the ortho-grid.

7. The apparatus according to claim 1, further comprising:
   a yoke;
   a gimbal rotationally attached to the yoke; and
   an actuator that moves the apparatus between a deployed and stowed position;
   wherein the pressure vessel slidably engages with the yoke such that the gimbal and yoke are stowed in the pressure vessel when the apparatus is in the stowed position.

8. The apparatus according to claim 7, further comprising:
   a seal;

wherein the apparatus includes a deployed position and a stowed position, and wherein the seal is engaged between the gimbal and the pressure vessel in the stowed position.

9. The apparatus according to claim 8, wherein the seal is a multistage seal, the multistage seal further comprising:
a first seal that seals a first interior space from a gas or fluid; and
a second seal that isolates a second interior space from the first interior space.

10. The apparatus according to claim 9, wherein the second seal is circumferentially arranged around an axis and the first seal is circumferentially arranged around both the second seal and the axis.

11. The apparatus according to claim 1, wherein the iso-grid is fixed to the ortho-grid at the cylindrical spar.

12. The apparatus according to claim 1, wherein each vertical column terminates at an iso-grid rim proximate to a radial spoke of the iso-grid.

13. The apparatus according to claim 1, wherein the ortho-grid and iso-grid form a node-matched design that maximizes hydrodynamic pressure joint strength.

14. The apparatus according to claim 1, wherein the ortho-grid receives a biaxial pressure load and the iso-grid receives a multiaxial pressure load, and wherein stress propagation converts the biaxial load to the multiaxial load.

15. The apparatus according to claim 1, wherein radial spokes of the iso-grid direct radial forces from an iso-grid rim to a hub.

16. The apparatus according to claim 1, wherein the pressure vessel is a single structural unit incorporating both the ortho-grid and iso-grid as integral load-bearing components.

17. The apparatus according to claim 1, wherein both the ortho-grid and iso-grid are positioned within the same cylindrical pressure vessel wall structure.

18. The apparatus according to claim 1, further comprising:
optical equipment housed within the pressure vessel;
wherein the pressure vessel is configured for subsea operation.

19. The apparatus according to claim 18, wherein the node-matched ortho-grid and iso-grid design provides structural integrity for protecting the optical equipment in high-pressure subsea environments.

* * * * *